United States Patent [19]

Gurgone

[11] 4,123,745
[45] Oct. 31, 1978

[54] VEHICLE THEFT PREVENTION SYSTEM

[76] Inventor: Joseph F. Gurgone, 241 W. 24th St., Chicago, Ill. 60616

[21] Appl. No.: 763,828

[22] Filed: Jan. 31, 1977

Related U.S. Application Data

[63] Continuation-in-part of Ser. No. 707,838, Jul. 22, 1976, abandoned.

[51] Int. Cl.² .............................................. B60R 25/04
[52] U.S. Cl. ........................................ 340/63; 340/53; 307/10 AT; 180/114
[58] Field of Search .................. 340/53, 63, 64, 274 R, 340/276; 307/10 AT; 180/114

[56] References Cited

U.S. PATENT DOCUMENTS

| | | | |
|---|---|---|---|
| 3,649,962 | 3/1972 | Bedard et al. | 340/64 |
| 3,740,713 | 6/1973 | Teich | 340/64 |
| 3,781,789 | 12/1973 | Caleskie et al. | 340/64 |
| 3,930,226 | 12/1975 | Plumberg | 340/64 |
| 3,956,732 | 5/1976 | Teich | 340/64 |

Primary Examiner—Alvin H. Waring
Attorney, Agent, or Firm—Allegretti, Newitt, Witcoff & McAndrews

[57] ABSTRACT

An automatic theft prevention system for use in a vehicle powered by an engine that includes an ignition system operative from an ignition switch which is closed in order to run the engine and opened in order to stop the engine. The vehicle also includes a door for entry and a lid for gaining access to a portion of the vehicle, such as the trunk or hood. When the ignition switch is opened and a door to the vehicle is opened, the system automatically disables the ignition of the vehicle and enables an alarm system within two minutes after the door is closed. After the alarm system is enabled, an attempt to open the trunk or hood causes the alarm to sound instantaneously, whereas an attempt to open a door does not sound the alarm for a period of ten seconds. This feature enables the driver to gain entry to the vehicle and disarm the alarm system from the inside.

11 Claims, 5 Drawing Figures

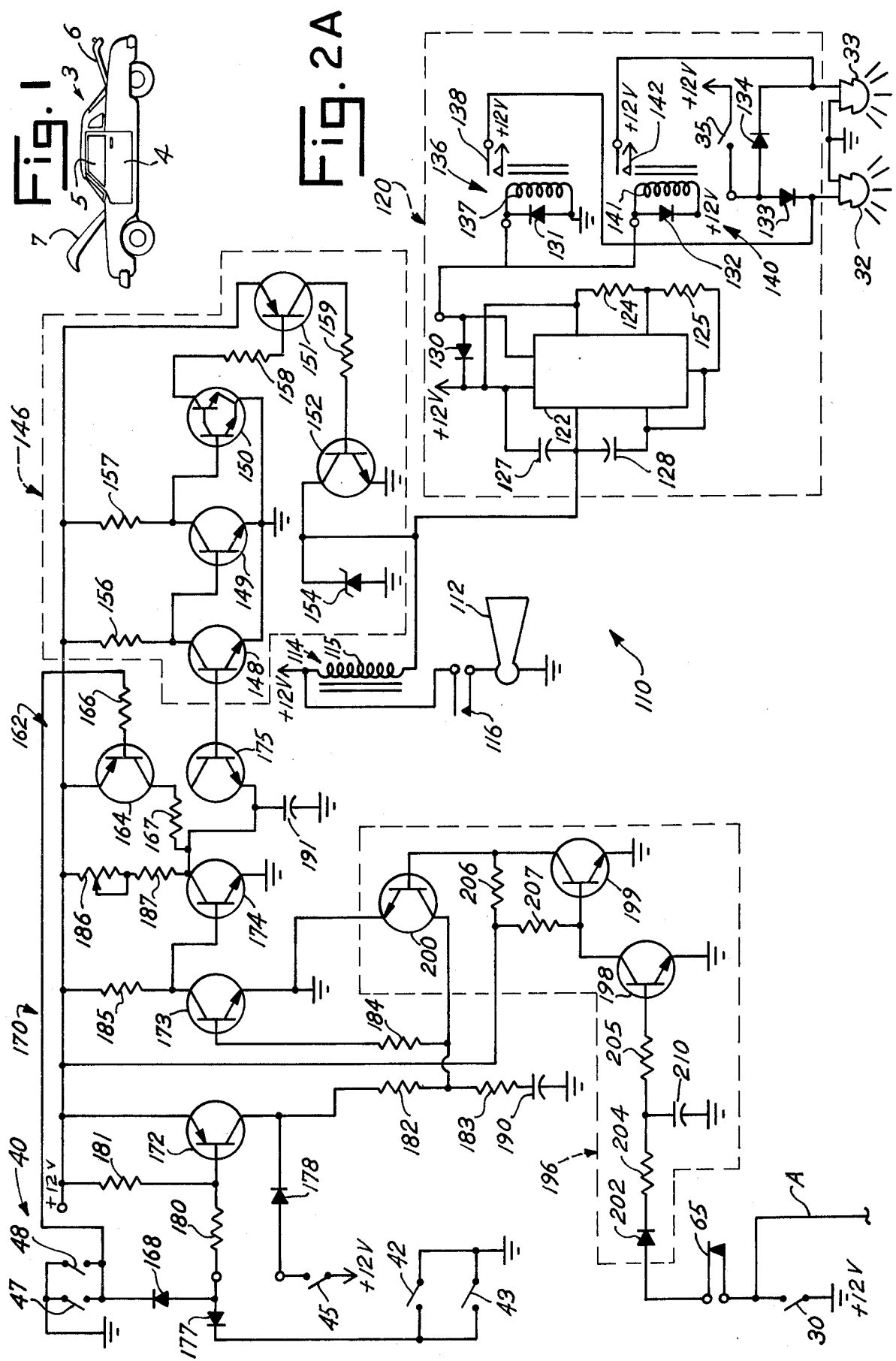

VEHICLE THEFT PREVENTION SYSTEM

RELATED APPLICATION

This is a continuation-in-part of U.S. Application Ser. No. 707,838, entitled "Vehicle Theft Prevention System", filed July 22, 1976, in the name of Joseph F. Gurgone, now abandoned.

BACKGROUND AND SUMMARY OF THE INVENTION

This invention relates to vehicle theft prevention systems, and more particularly relates to such systems which incorporate a means for disabling the vehicle as well as an alarm.

Although many systems have been devised in the past for raising an alarm when a burglar attempts to gain entry to a vehicle, each of these systems has exhibited disadvantages which have limited its usefulness. For example, the known prior systems do not provide a means for automatically disabling an ignition system of a vehicle. Moreover, unauthorized entry to the vehicle normally triggers the alarm immediately, so that the operator must disarm the alarm from outside the vehicle. The location of the disarming switch outside the vehicle increases the chances that a thief will be able to avoid the alarm.

Accordingly, it is an object of the present invention to provide an improved theft prevention system in which the ignition system of a vehicle is automatically disabled when the operator leaves the vehicle.

Another object of the invention is to provide an improved vehicle burglar alarm system in which the sounding of the alarm is delayed if a door is opened, so that the alarm can be disarmed from inside the vehicle.

Still another object of the present invention is to provide a system of the foregoing type in which unauthorized entry to the vehicle results in the vehicle headlamps being alternately flashed on and off.

DESCRIPTION OF THE DRAWINGS

These and other objects, advantages and features of the present invention will hereafter appear in connection with the accompanying drawings wherein like numbers refer to like parts throughout, and wherein:

FIG. 1 is a schematic drawing of an exemplary vehicle employing a preferred embodiment of the present invention;

FIGS. 2A and 2B are electrical schematic drawings illustrating a preferred embodiment of the present invention.

DESCRIPTION OF THE PREFERRED EMBODIMENTS

Figure 2B:
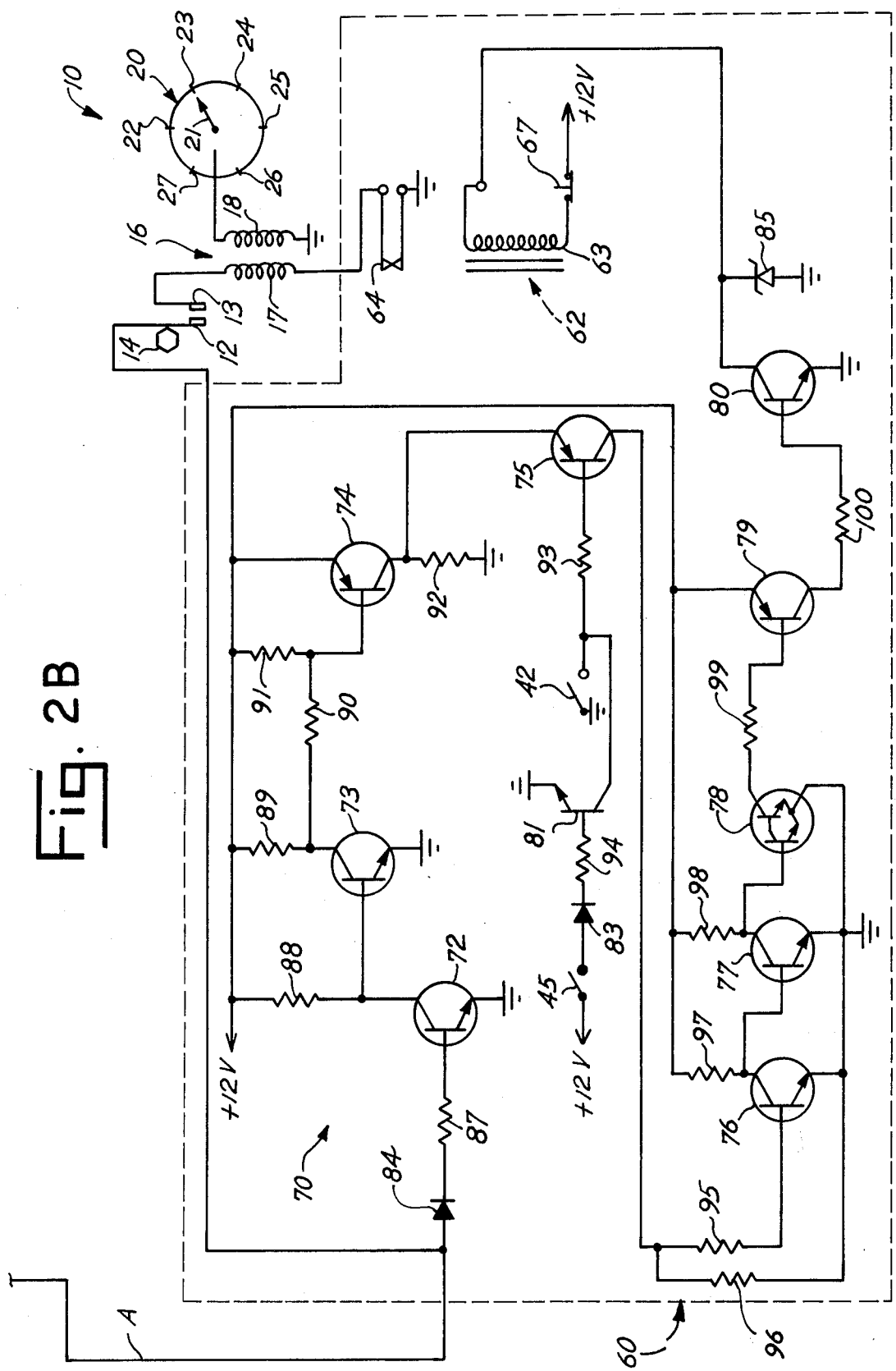

Referring to FIG. 1, the preferred embodiment is useful in a conventional motor vehicle 3 having a left-hand or driver door 4 and a right-hand door 5. The vehicle also includes a trunk lid 6 and a hood lid 7 which covers the engine. Referring to FIG. 2B, the vehicle includes an ignition system 10 in which conventional breaker points 12, 13 are opened and closed in synchronism with the engine by a cam 14. The breaker points control the flow of current through the primary 17 of an ignition coil 16. The interruption of current flow through the primary induces a large voltage in a secondary 18 which is transmitted to the rotor 21 of a conventional distributor 20. The distributor includes terminals 22 – 27, one terminal for each spark plug of the vehicle engine. Operation of the ignition system is controlled by an ignition switch 30 (FIG. 2A) which can be closed in order to start and run the engine by the use of a key. In order to stop the engine, the ignition switch is opened. The electrical system of the vehicle also includes conventional headlights 32 and 33 which are turned off and on by a switch 35 located on a dash board of the vehicle.

A preferred form of the present invention basically comprises a switch assembly 40, cutoff system 60, and an alarm system 110.

More specifically, switch assembly 40 comprises door switches 42 and 43 which may be the door switches mounted in the vehicle at the factory. These switches normally are used to light the interior of the vehicle when the doors are open. Most of the manufacturers use a system in which the door switches, such as 42 and 43, are grounded to the chasis. However, some manufacturers, such as Ford Motor Company, use a system in which the door switches are connected to the +12 volt battery supply. An example of this arrangement is switch 45. Door switches 42, 43 and 45 are shown in FIG. 2A in the door closed position. In other words, the switches are open when the vehicle doors are closed.

Switch assembly 40 also includes a trunk lid switch 47 and a hood like switch 48. These switches also are shown in the lid closed position. That is, switches 47 and 48 are open when the trunk lid and hood lid are closed, and the switches are closed when the trunk lid and hood lid are open.

Referring to FIG. 2B, cutoff system 60 includes a latching relay 62 and a cutoff control circuit 70. More specifically, relay 62 includes a coil 63 which operates normally-closed contacts 64 (FIG. 2B) and 65 (FIG. 2A). Assuming momentary reset switch 67 is closed, the transmission of a DC cutoff signal through coil 63 latches contacts 64 and 65. As shown in FIG. 2B, when contacts 64 are open, the ignition system 10 is disabled because current cannot flow through primary coil 17. If reset switch 67 is opened, the supply of +12 volts DC to coil 63 is interrupted, thereby generating a reset signal which returns contacts 64 and 65 to their normally closed positions.

Cutoff control circuit 70 comprises transistors 72 – 81, switching diodes 83, 84, Zener diode 85, all connected as shown. The circuit receives power from a +12 volt supply, and it is connected to switches 42, 45 in the manner shown. Circuit 70 generates the DC cutoff signal which latches relay 62 in response to the closing of door switch 42 and the opening of ignition switch 30. In other words, relay 62 latches in order to disable the ignition system when the driver turns off the ignition and leaves the vehicle. This is an important feature because the ignition system automatically is disabled even if the operator forgets to disable it.

Referring to FIG. 2A, alarm system 110 basically comprises a siren 112, a flasher circuit 120, a driver circuit 146, control circuits 162 and 170, and a setting circuit 196. Siren 112 makes a loud sound when current flows through coil 115 of relay 114 so that normally-open contacts 116 are closed. Current is conducted through coil 115 in response to an alarm signal generated by driver circuit 146.

Flasher circuit 120 comprises an astable multivibrator 122 which has a time constant controlled by resistors 124, 125 and capacitors 127, 128. The circuit also includes diodes 130 – 134 and relays 136 and 140 connected as shown. Relay 136 includes a coil 137 which operates normally-open contacts 138, and relay 140 includes a coil 141 which operates normally-open contacts 142. As soon as driver circuit 146 generates an alarm signal, multi-vibrator 122 causes contacts 138 and 140 to alternately switch on and off.

Driver circuit 146 includes transistors 148 – 152, a Zener diode 154 and resistors 156 – 159, all connected as shown. Driver circuit 146 generates the alarm signal in response to security signals received from either control circuit 162 or control circuit 170.

Control circuit 162 comprises a transistor 164, resistors 166, 167 and a diode 168 connected as shown. Control circuit 170 comprises transistors 172 – 175, diodes 177, 178, resistors 180 – 187 and capacitors 190, 191, connected as shown. It should be noted that transistor 175 has its collector element unconnected and is used as a reverse-biased diode.

Setting circuit 196 comprises transistors 198 – 200, a diode 202, resistors 204 – 207 and a capacitor 210, connected as shown.

The system operates in the following manner. Assuming the operator of the vehicle wants to secure it, he stops the engine by opening ignition switch 30 and leaves the vehicle through driver's door 4. As soon as the ignition switch is opened, transistor 74 (FIG. 2B) is switched to its conductive state so that current is supplied to the emitter of transistor 75. As soon as door 4 is opened by the operator, switch 42 is closed so that transistor 75 is switched to its conductive state. This operation results in the generation of the cutoff signal by transistors 76 – 80 which latches relay 62. As soon as relay 62 is latched, contacts 64 (FIG. 2B) and 65 (FIG. 2A) are opened, so that ignition system 10 is disabled, and the ignition switch is disconnected from setting circuit 196 (FIG. 2A).

Capacitor 210 previously has been charged to a positive voltage so that transistor 198 is held in its conductive state for approximately two minutes. This mode of operation causes transistor 200 to be switched to its conductive state and transistor 173 to be switched to its non-conductive state for approximately two minutes, thereby preventing the generation of an alarm signal. The foregoing operation is an important feature, which gives the driver approximately two minutes to exit the vehicle and to operate either the trunk lid or hood lid before the alarm is triggered.

Two minutes after the driver has left the vehicle, the alarm system is fully armed and ready for operation. In the event that unauthorized entry to the vehicle is attempted through the trunk or the hood, switches 47 or 48 will be closed so that transistor 152 is switched to its conductive state and current flows through coil 115 of relay 114, thereby closing contacts 116 and sounding siren 112. At the same time, flasher circuit 120 begins operation so that headlights 32 and 33 alternately flash on and off.

Assuming there has been no unauthorized entry, the returning driver opens door 4 and enters the vehicle, thereby momentarily closing switch 42. As soon as switch 42 is closed, transistors 172, 173 are switched to their conductive states, and transistor 174 is switched to its non-conductive state, thereby allowing capacitor 191 to charge through resistors 186 and 187. After about ten seconds, capacitor 191 is charged to a sufficiently high voltage to cause transistor 148 to switch to its conductive state, thereby generating the alarm signal. If during the ten second charging period of capacitor 191 the driver momentarily opens reset switch 67 (FIG. 2B) and closes ignition switch 30 (FIG. 2A), transistors 198 and 200 are switched to their conductive states so that transistor 173 is switched to its non-conductive state, thereby preventing the generation of the alarm signal. This is an important feature which enables the driver to enter the vehicle and disable the alarm system without requiring him to operate any controls from outside the vehicle. This increases the security of the alarm system and makes it more difficult to overcome. Of course, if an unauthorized operator manages to gain access to the vehicle through the door, but fails to open the reset switch and close the ignition switch within ten seconds, the siren will sound and the headlights will alternately flash on and off. Thus, the car remains fully secure irrespective of whether unauthorized entry is gained through the trunk, hood or door.

Figure 3A:
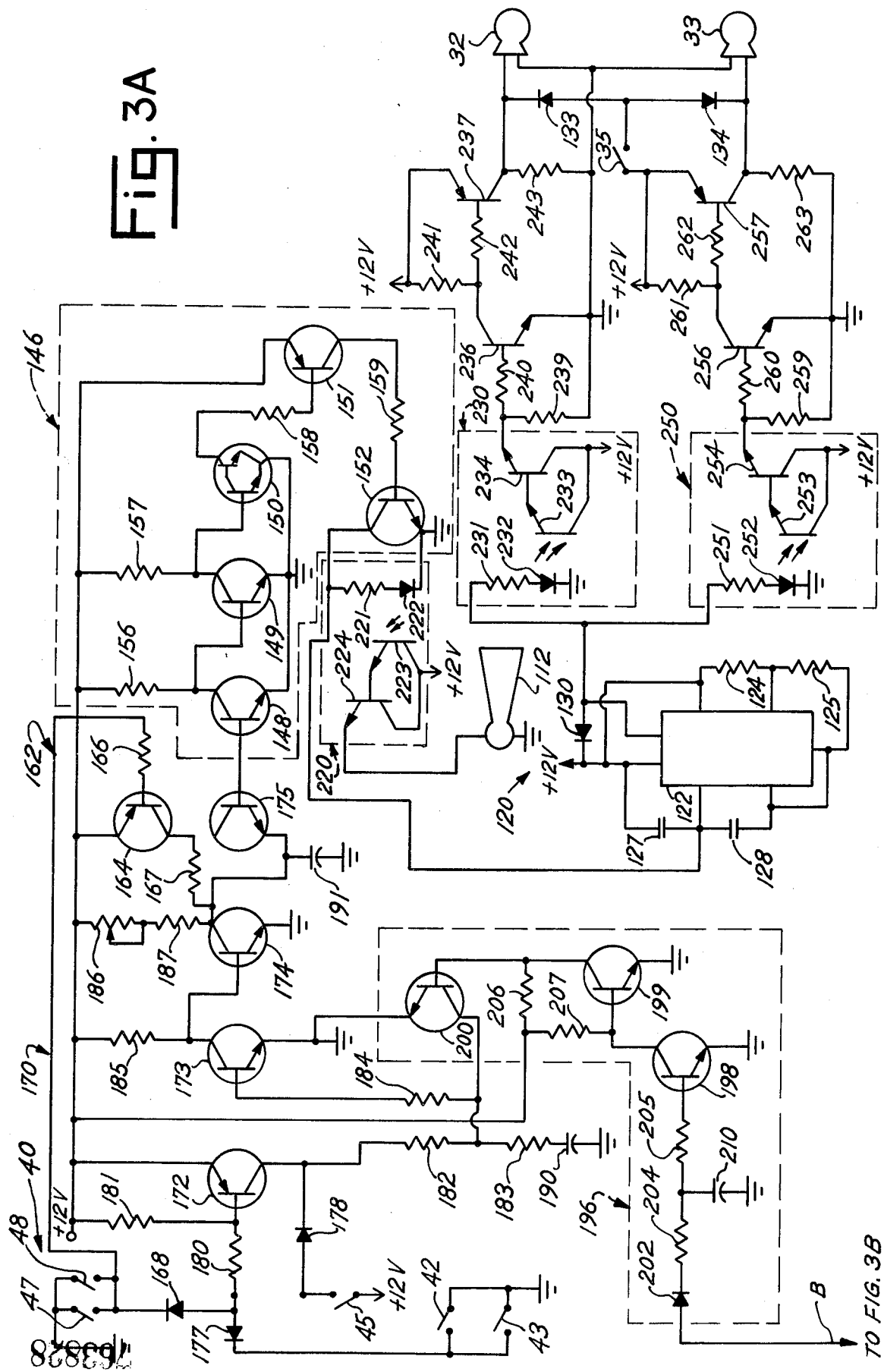
FIGS. 3A and 3B are electrical schematic drawings showing alternative embodiments of the flasher circuit 120 and the cutoff system as shown in FIGS. 2A and 2B.

Referring to FIG. 3A, the second embodiment of driver circuit 146 comprises an opto-coupler 220 including a resistor 221, a light-emitting diode 222, a photo-conductive transistor 223 and a driver transistor 224. As soon as transistor 152 is switched on, a +12 volts signal conducted through transistor 224 sounds siren 112.

Still referring to FIG. 3A, the second embodiment of flasher circuit 120 comprises an opto-coupler 230 including a resistor 231, a light-emitting diode 232, a photo-conductive transistor 233 and a driver transistor 234. An amplifying circuit includes transistors 236, 237 and resistors 239 – 243 connected as shown. Circuit 120 also comprises another opto-coupler 250 including a resistor 251, a light-emitting diode 252, a photo-conductive transistor 253 and a driver transistor 254. An amplifying circuit includes transistors 256, 257 and resistors 259 – 263 connected as shown. As soon as driver circuit 146 generates an alarm signal, multi-vibrator 122 causes transistors 237, 257 to alternately switch on and off, thereby causing headlamps 32, 33 to alternately flash on and off.

Figure 3B:
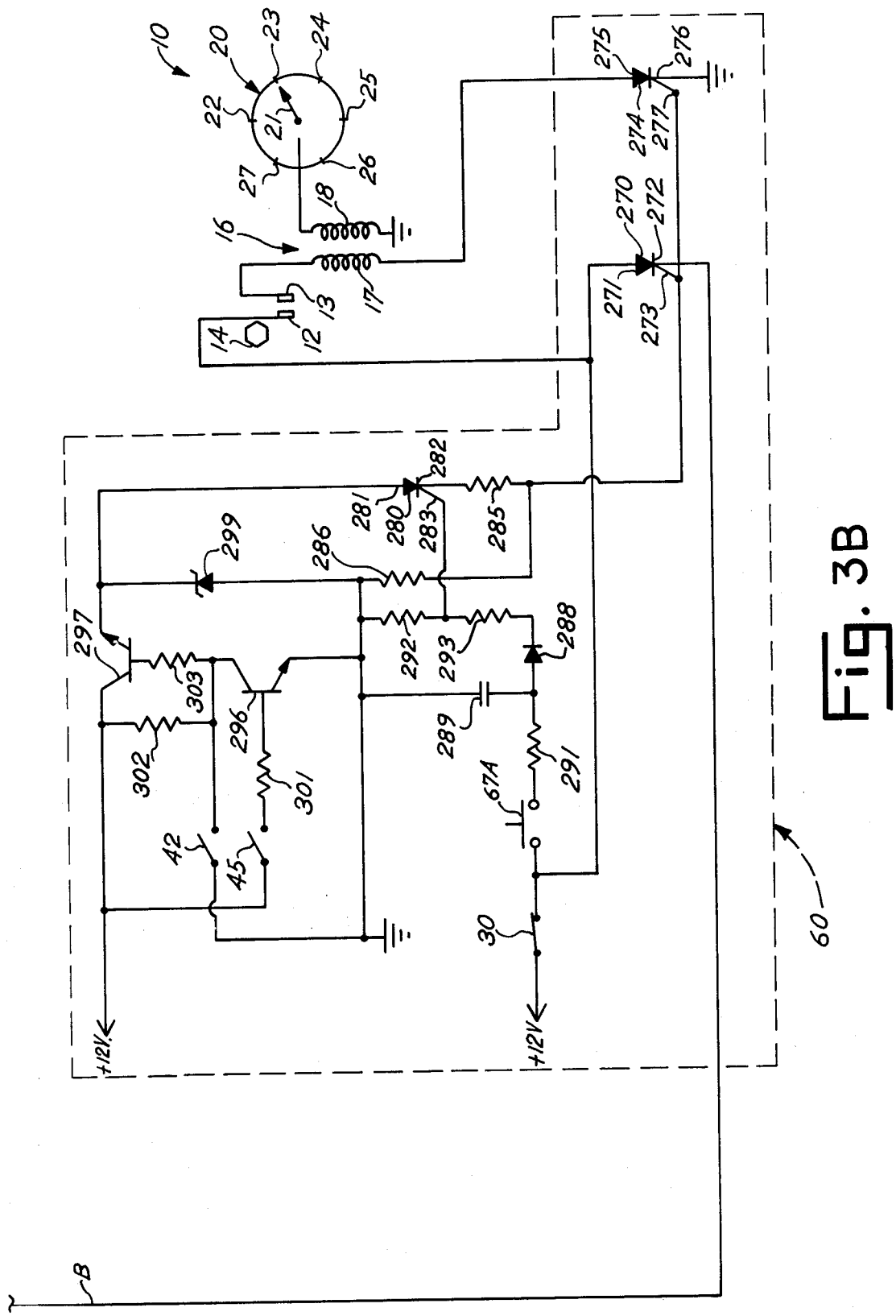

Referring to FIG. 3B, the second embodiment of cutoff system 60 includes a normally open reset switch 67A which is similar to switch 67. A switching silicon controlled rectifier (SCR) 270 has an anode 271, a cathode 272 and a gate 273. Cathode 272 is connected to diode 202 through a conductor B (FIG. 3A). Another switching silicon controlled rectifier (SCR) 274 includes an anode 275, a cathode 276 and a gate 277. The anode - cathode junction is connected in series with primary coil 17. A control silicon controlled rectifier (SCR) 281 includes an anode 281, a cathode 282 and a gate 283. Resistors 285, 286 supplying gating voltage to SCR's 270, 274. A circuit for controlling the voltage to gate 283 includes a diode 288, a capacitor 289 and resistors 291 – 293. A circuit for supplying voltage to anode 281 includes transistors 296, 297, a Zener diode 299 and resistors 301 – 303.

The remaining components shown in FIGS. 3A and 3B are identical to the like-number components shown in FIGS. 2A and 2B. Assuming SCR 274 is in its non-conductive state, ignition system 10 is disabled because current cannot flow through primary coil 17. If SCR 274 is switched to its conductive state, the ignition system is enabled.

The system illustrated in FIGS. 3A and 3B operates in the following manner. When the car is being driven and all doors are closed, the various switches are in the positions shown in the drawings. Transistor 297 is switched on and SCR's 270, 274 and 280 are switched on to enable the ignition system. Assuming the operator of the vehicle wants to secure it, he stops the engine by opening ignition switch 30 and leaves the vehicle through driver's door 4. As soon as the ignition switch is opened and door 4 is opened by the operator, switch 42 is closed so that transistor 75 is switched off. This operation results in the generation of the cutoff signal which interrupts the anode current to SCR 280 and switches SCR 280 to its non-conductive state. As a result, the gate voltage is removed from SCR's 270, 274 and ignition system 10 is disabled. When door 4 is closed, transistor 297 is switched on, but SCR 280 remains in its non-conductive state because its gate voltage has been removed.

Capacitor 210 previously has been charged to a positive voltage so that transistor 198 is held in its conductive state for approximately 2 minutes. This mode of operation causes transistor 200 to be switched to its conductive state and transistor 173 to be switched to its non-conductive state for approximately 2 minutes, thereby preventing the generation of an alarm signal. The foregoing operation is an important feature, which gives the driver approximately 2 minutes to exit the vehicle and to operate either the trunk lid or hood lid before the alarm is triggered.

2 minutes after the driver has left the vehicle, the alarm system is fully armed and ready for operation. In the event that unauthorized entry to the vehicle is attempted through the trunk or the hood, switches 47 or 48 will be closed so that transistor 152 is switched to its conductive state. Light then is emitted from diode 222 and transistor 224 is switched on thereby sounding siren 112. At the same time, flasher circuit 120 begins operation so that headlights 32 and 33 alternately flash on and off.

Assuming there has been no unauthorized entry, the returning driver opens door 4 and enters the vehicle, thereby momentarily closing switch 42. As soon as switch 42 is closed, transistors 172, 173 are switched to their conductive states, and transistor 174 is switched to its non-conductive state, thereby allowing capacitor 191 to charge through resistors 186 and 187. After about ten seconds, capacitor 191 is charged to a sufficiently high voltage to cause transistor 148 to switch to its conductive state, thereby generating the alarm signal.

If during the ten second charging period of capacitor 191 the driver momentarily closes reset switch 67A (FIG. 3B) and simultaneously closes ignition switch 30 (FIG. 3B), SCR 280 is switched to its conductive state so that gate voltage is supplied to SCR's 270, 274, which in turn, are switched to their conductive states. As soon as SCR 270 is switched on, transistors 198 and 200 are switched to their conductive states so that transistor 173 is switched to its non-conductive state, thereby preventing the generation of the alarm signal. This is an important feature which enables the driver to enter the vehicle and disable the alarm system without requiring him to operate any controls from outside the vehicle. This increases the security of the alarm system and makes it more difficult to overcome. Of course, if an unauthorized operator manages to gain access to the vehicle through the door, but fails to close the reset switch and close the ignition switch within 10 seconds, the siren will sound and the headlights will alternately flash on and off. Thus, the car remains fully secure irrespective of whether unauthorized entry is gained through the trunk, hood or door.

Those skilled in the art will recognize that only two preferred embodiments of the present invention have been disclosed, but that alternative embodiments can be devised which are within the scope of the appended claims. For example, the switches could be located at portions of the vehicle other than the trunk, hood and doors. Likewise, alternative forms of alarms could be used and different portions of the ignition system could be disabled by the cutoff circuit.

What is claimed is:

1. An automatic theft prevention system for use in a vehicle powered by an engine including an ignition system operated from an ignition switch which is closed in order to run the engine and opened in order to stop the engine, a door for entry to the vehicle, a lid for gaining access to a portion of the vehicle and first and second headlights, said theft prevention system comprising:
    a first switch operable in a first state when the door is open and operable in a second state when the door is closed;
    cutoff means for automatically disabling the ignition system in response to a cutoff signal and for automatically enabling the ignition system in response to a reset signal;
    cutoff control means for generating the cutoff signal in response to the simultaneous opening of the ignition switch and the operation of the first switch in the first state, whereby the ignition system is automatically disabled; and
    reset means for generating the reset signal in response to manual actuation by an operator of the vehicle, whereby the operation of the vehicle is enabled.

2. A system, as claimed in claim 1, and further comprising:
    a second switch operable in a first state when the lid is open and operable in a second state when the lid is closed;
    alarm means for creating an alarm in response to an alarm signal;
    driver means for generating the alarm signal in response to a first security signal or a second security signal;
    first security control means for generating the first security signal as soon as the second switch is operated in the first state in response to the opening of the lid so that the alarm is created; ;p1 second security control means for generating the second security signal following a first predetermined time period after the first switch is operated in the first state in response to the opening of the door so that the alarm is created after a delay; and
    setting control means responsive to the closing of the ignition switch and the generation of the reset signal for preventing the generation of the alarm signal so that the operator can enter the vehicle during the first predetermined time period without creating the alarm, and responsive to the opening of the ignition switch and the cutoff signal for preventing the generation of the alarm signal during a second predetermined time period in which the operator can leave the vehicle without creating the alarm.

3. A system, as claimed in claim 1, wherein the first switch is closed in the first state and open in the second state.

4. A system, as claimed in claim 1, wherein the cutoff means comprises a latching relay including contacts wired in series with the ignition system of the vehicle.

5. A system, as claimed in claim 1, wherein the cutoff control means comprises:
- a transistor including a base element, an emitter element and a collector element; and
- means for biasing the transistor into a conductive state in response to the simultaneous opening of the ignition switch and the operation of the first switch in the first state.

6. A system, as claimed in claim 4, wherein the reset means comprises a third switch wired in series with the latching relay.

7. A system, as claimed in claim 1, wherein the cutoff means comprises a first silicon controlled rectifier wired in series with the ignition system of the vehicle.

8. A system, as claimed in claim 1, wherein the cutoff control means comprises:
- a second silicon controlled rectifier for supplying gate voltage to the first silicon controlled rectifier;
- means for interrupting anode current to the second silicon controlled rectifier in response to the opening of the door; and
- means for supplying gate voltage to the second silicon controlled rectifier in response to the simultaneous closing of the ignition switch and the generation of the reset signal.

9. A system, as claimed in claim 2, wherein the alarm means comprises a transducer for creating an audible sound.

10. A system, as claimed in claim 2, wherein the alarm means comprises astable multivibrator means for alternately turning the first and second headlights on and off.

11. A system, as claimed in claim 2, wherein the first predetermined time period is about 10 seconds and the second predetermined time period is about 2 minutes.

* * * * *